US006963059B2

(12) United States Patent
Lauffenburger et al.

(10) Patent No.: US 6,963,059 B2
(45) Date of Patent: Nov. 8, 2005

(54) METHOD AND SYSTEM FOR OPTIMIZING ILLUMINATION POWER AND INTEGRATION TIME IN AN OPTICAL SENSING DEVICE

(75) Inventors: James Harold Lauffenburger, Colorado Springs, CO (US); Gil Afriat, Colorado Springs, CO (US); Robert R. Rotzoll, Green Mountain, CO (US)

(73) Assignee: EM Microelectronic-Marin SA, Marin (CH)

( * ) Notice: Subject to any disclaimer, the term of this patent is extended or adjusted under 35 U.S.C. 154(b) by 175 days.

(21) Appl. No.: 10/609,686

(22) Filed: Jul. 1, 2003

(65) Prior Publication Data

US 2005/0001142 A1 Jan. 6, 2005

(51) Int. Cl.[7] .................................................. G01J 1/32
(52) U.S. Cl. .................................. 250/205; 250/214 R
(58) Field of Search ............................ 250/205, 214 R; 315/152, 156, 157, 158

(56) References Cited

U.S. PATENT DOCUMENTS 4,967,066 A * 10/1990 Beraldin ..................... 250/205
5,288,993 A 2/1994 Bidiville et al.
5,574,480 A 11/1996 Pranger et al.
5,578,813 A 11/1996 Allen et al.
5,644,139 A 7/1997 Allen et al.
5,703,356 A 12/1997 Bidiville et al.
5,999,166 A 12/1999 Rangan
6,379,013 B1 4/2002 Bechtel et al.
2002/0070919 A1 6/2002 Kajihara
2003/0102425 A1 6/2003 Rotzoll et al.
2003/0103037 A1 6/2003 Rotzoll

FOREIGN PATENT DOCUMENTS

WO WO 03/049018 A1 6/2003

* cited by examiner

*Primary Examiner*—David Porta
*Assistant Examiner*—Tony Ko
(74) *Attorney, Agent, or Firm*—Sughrue Mion, PLLC

(57) ABSTRACT

There is described an optical sensing device, a method for controlling operation of an optical sensing device comprising a light source for illuminating a surface portion with radiation, a photodetector device having at least one photosensitive element responsive to radiation reflected from the illuminated surface portion, and conversion means for integrating an output signal of said at least one photosensitive element over time during an integration period of variable duration, which duration depends on power of the light source and level of radiation reflected from the illuminated surface portion. The optical sensing device further comprises a regulating system for controlling power if the light source as a function of a comparison between a parameter representative of the evolution of the integration of the output signal of the said at least one photosensitive element and at least one reference value. Regulation is advantageously performed by timing the duration of the integration period or by determining the rate of evolution of the integrated signal, comparing this duration or rate of evolution with at least one reference value and controlling power of the light source as a function of the result of the comparison. There is also described an optical pointing device implementing the above regulation scheme as well as an optical sensing device exploiting this scheme so as to sense proximity of the illuminated surface portion with respect to the optical sensing device.

24 Claims, 5 Drawing Sheets

Fig. 3
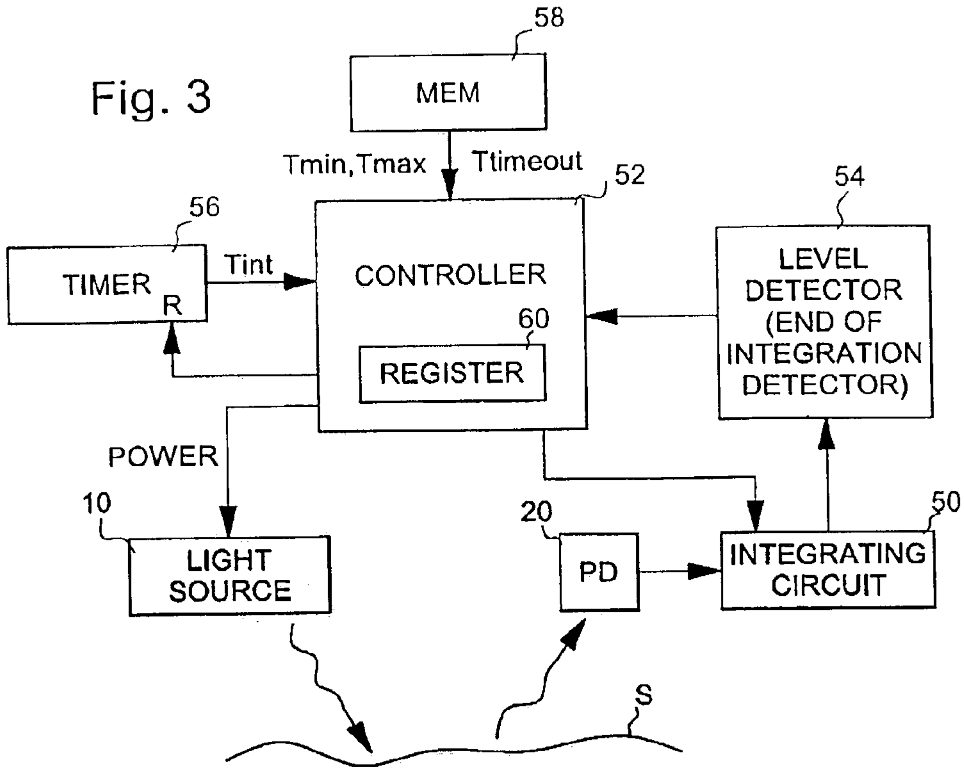
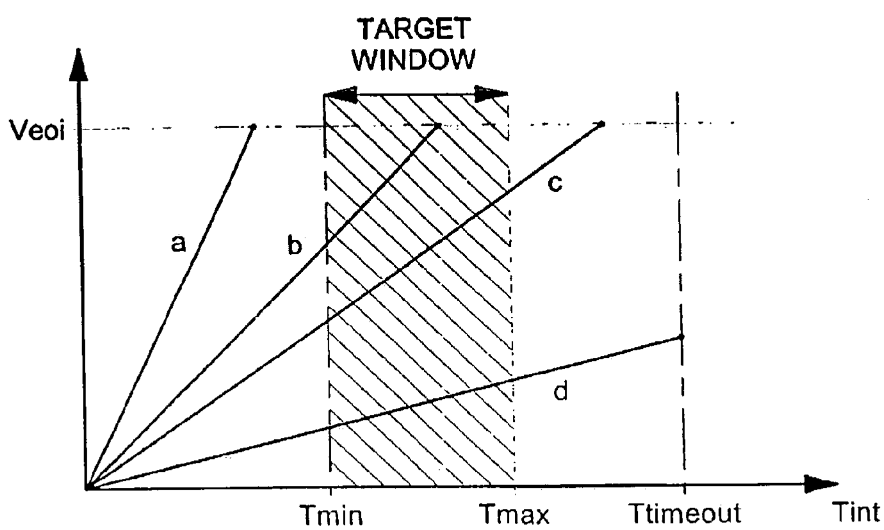
Fig.4

METHOD AND SYSTEM FOR OPTIMIZING ILLUMINATION POWER AND INTEGRATION TIME IN AN OPTICAL SENSING DEVICE

FIELD OF THE INVENTION

The present invention generally relates to optical sensing devices comprising a light source for illuminating a surface portion with radiation, a photodetector device having at least one photosensitive element responsive to radiation reflected from the illuminated surface portion and conversion means (or integrating means) for integrating an output signal of the said at least one photosensitive element over time during an integration period of variable duration. Such optical sensing devices are particularly used in optical pointing devices such as mice, trackballs and other similar computer peripherals. The present invention also concerns a method for operating the above optical sensing device as well as an optical pointing device equipped with the above constituent parts of the optical sensing device.

BACKGROUND OF THE INVENTION

Optical pointing devices are already known in the art. U.S. Pat. No. 5,288,993 for instance discloses a cursor pointing device utilizing a photodetector array and an illuminated target ball having randomly distributed speckles. U.S. Pat. No. 5,703,356 (related to the above-mentioned U.S. Pat. No. 5,288,993) further discloses (in reference to FIGS. 23A and 23B of this document) an optical cursor pointing device in the form of a mouse which does not require a ball and wherein light is reflected directly from the surface over which the pointing device is moved.

In both cases, the optical pointing device includes a light source for repetitively illuminating a surface portion (i.e. a surface portion of the ball or a portion of the surface over which the optical pointing device is moved) with radiation and an optical sensing unit comprising a photodetector array including a plurality of pixels each having a photosensitive element which is responsive to radiation reflected from the illuminated surface portion. The pixels outputs of the photodetector array are typically coupled to conditioning and processing circuits for tracking and extracting information about the relative motion between the sensing unit and the illuminated surface portion.

The technique used in above-cited U.S. Pat. Nos. 5,288,993 and 5,703,356 in order to extract motion-related information is based on a so-called "Edge Motion Detection" technique. This "Edge Motion Detection" technique essentially consists in a determination of the movement of edges (i.e. a difference between the intensity of pairs of pixels) in the image detected by the photodetector array. Edges are defined as spatial intensity differences between two pixels of the photodetector array. The relative motion of each of these edges is tracked and measured so as to determine an overall displacement measurement which is representative of the relative movement between the photodetector array and the illuminated portion of the surface.

An improved motion detection technique based on the above "Edge Motion Detection" technique is the subject matter of a pending international application No. PCT/EP 02/13686 filed on Dec. 3, 2002 (under priority of U.S. provisional application No. 60/335,792 of Dec. 5, 2001) in the name of the present Applicant and entitled "Method and sensing device for motion detection in an optical pointing device, such as an optical mouse" (published under No. WO 03/049018 A1).

In optical sensing devices, it is commonly known to couple a conversion circuit (or integration circuit) to each photosensitive element of the photodetector device so as to integrate the output signals of these photosensitive elements over time during a so-called integration period. FIG. 1 schematically shows the general principle of an integrating circuit, designated by reference numeral 1100, coupled to a photosensitive element, in this case a photodiode, designated by reference numeral 1000. This integrating circuit 1100 typically consists of an amplifier 1110 and a capacitive element 1120 (or integration capacitor) connected between the output and the inverting input of the amplifier, the photosensitive element 1000 being connected to the inverting input of the amplifier while the non-inverting input of the amplifier is tied to a reference potential such as ground. The integrating circuit 1100 outputs a voltage signal Vout, or integrated signal, which varies over time and which is in essence the result of the integration over time of the current signal iout produced by the photosensitive element 1000. Assuming that current iout has a substantially constant value during the period where integrating circuit is active (i.e. during the so-called integration period), the output voltage Vout will vary substantially linearly over time.

In some cases, the integration period is set to have a fixed duration. In some other cases, however, the duration of the integration period may be variable. This is the case for instance of the solution described in pending U.S. patent application Ser. No. 10/001,963 filed on Dec. 5, 2001 in the name of the present Applicant and entitled "Method, sensing device and optical pointing device including a sensing device for comparing light intensity between pixels", which is incorporated herein by reference (this application is published under No. US 2003/0102425 A1). This solution is also the subject matter of a pending international application No. PCT/EP 02/13486 filed on Dec. 3, 2002 under priority of the above US patent application (this international application is published under No. WO 03/049017 A1).

The solution described in pending U.S. patent application Ser. No. 10/001,963 basically consists in integrating the output signals of the photosensitive elements until a predetermined threshold is reached. Interruption of the integration period can for instance be performed by monitoring when the integrated signal of the most illuminated pixel in the photodetector array (i.e. the "brightest" pixel) reaches the threshold or by monitoring when an averaged (or summed) signal derived from the integrated signals reaches the threshold. In both cases, one will understand that the duration of the integration period is defined by the time taken by the integrated signal to reach the threshold, which time depends on the level of light detected by the photosensitive elements. The duration of the integration period is thus variable.

When applying the above integration scheme in an optical sensing device or in optical pointing device as defined above (i.e. with light source, photodetector device and conversion means), one will understand that the duration of the integration period will depend on the power of the light source and the level of radiation reflected from the illuminated surface portion.

Taking account of the fact that the level of radiation reflected from the illuminated surface portion depends on the optical properties of the surface, one will understand that the duration of the integration period may vary greatly as a function of the reflectivity of the surface. It is however desirable to have a better and more precise control on the duration of the integration period and to be less dependent on the type of surface which is used to reflect the radiation emitted by the light source. In particular, it is desirable to have a short integration time so as to ensure higher sensing speed and minimize power consumption of the optical sensing device. At the same time, it is desirable to have a sufficiently long integration time so as not to degrade the functionality of the analog circuitry (in particular the integrating circuit) of the optical sensing device. It is an object of the present invention to provide such a solution.

SUMMARY OF THE INVENTION

According to a first aspect of the invention, there is provided an optical sensing device comprising a light source for illuminating a surface portion with radiation, a photodetector device having at least one photosensitive element responsive to radiation reflected from the illuminated surface portion, and conversion means for integrating an output signal of the said at least one photosensitive element over time during an integration period of variable duration, which duration depends on power of the light source and level of radiation reflected from the illuminated surface portion, the optical sensing device further comprising a regulating system for controlling the power of the light source as a function of a comparison between a parameter representative of the evolution of the integration of the output signal of the said at least one photosensitive element and at least one reference value.

According to one embodiment, the representative parameter is the duration of the integration period and the regulating system comprises timer means for timing the duration of the integration period, comparator means for comparing the duration of the integration period with at least one reference duration value, and power control means for controlling the power of the light source as a function of the result of the comparison between the duration of the integration period and the said at least one reference duration value.

According to another embodiment, the representative parameter is a rate of evolution of the integrated output signal of the said at least one photosensitive element and the regulating means comprises means for determining the rate of evolution of the integrated output signal during the integration period, comparator means for comparing the determined rate of evolution with at least one reference rate value, and power control means for controlling the power of the light source as a function of the result of the comparison between the determined rate of evolution and the said at least one reference rate value.

According to a second aspect of the invention, there is provided a method for controlling operation of an optical sensing device having a light source and a photodetector device with at least one photosensitive element, the method comprising the steps of:

illuminating a surface portion with radiation by means of the light source, detecting radiation reflected from the illuminated surface portion with the said at least one photosensitive element, and while the surface portion is being illuminated, integrating an output signal of the said at least one photosensitive element over time during an integration period of variable duration, which duration depends on power of the light source and level of radiation reflected from said illuminated surface portion, the method further comprising the steps of:

determining a parameter representative of the evolution of the integration of the output signal of the said at least one photosensitive element, comparing the determined representative parameter with at least one reference value, and controlling power of the light source as a function of the result of the comparison between the determined representative parameter and the said at least one reference value.

Again, the representative parameter can be the duration of the integration period or the rate of evolution of the integrated output signal of the said at least one photosensitive element.

According to a third aspect of the invention, there is provided an optical pointing device comprising a light source for repetitively illuminating a surface portion with radiation, and an optical sensing unit comprising a photodetector array including a plurality of pixels responsive to radiation reflected from the illuminated surface portion, each of the pixels including a photosensitive element coupled to an integrating circuit for integrating an output signal of the photosensitive element during an integration period of variable duration, which duration depends on power of the light source and level of radiation reflected from the illuminated surface portion, wherein the optical pointing device further comprises a regulating system including means for determining a parameter representative of the evolution of the integration of the output signals of the photosensitive elements, comparator means for comparing the determined representative parameter with at least one reference value, and power control means for controlling the power of the light source as a function of the result of the comparison between the determined representative parameter and the said at least one reference value.

An advantage of the present invention resides in the fact that one can effectively act, through control of the power of the light source, on the duration of the integration period and ensure that this duration remains, in most cases, in the vicinity of a predetermined reference duration. One therefore has the ability to somewhat compensate for the changing reflectivity of various illuminated surfaces. For each type of surface, an optimal light source power and integration duration is thus found.

Control of the power of the light source also allows to optimise the power consumption of the optical device. Indeed, the invention allows selection of the more appropriate light source power to yield the desired integration duration, i.e. allows optimisation of the light source power for optimum integration time.

According to a preferred embodiment of the present invention, the power of the light source is controlled so that the duration of the integration period remains within a reference window having lower and upper reference values (advantageously programmable), light source power being increased so as to maintain the duration of the integration period below the upper reference value or decreased so as to maintain the duration of the integration period above the lower reference value. A reference window is preferable so that the light source power is not changed too frequently, which could degrade the device performance.

According to another embodiment of the present invention, integration of the photosensitive elements can be interrupted if the duration of the integration period reaches a predetermined timeout value. At the same time, power of the light source can be increased. If the timeout condition keeps occurring and the power of the light source is set at its maximum, this can be interpreted as being indicative of a "loss of reflection" condition, i.e. that the distance between the sensing device and the surface is too great. This "loss of reflection" condition can for instance occur if an optical mouse implementing the above solution is lifted from the surface over which it is normally moved. Under such a condition, the activation rate of the light source, photodetector device and regulating system may furthermore be set to a minimum for the purpose of saving power.

According to a fourth aspect of the invention, there is accordingly also provided an optical sensing device comprising a light source for illuminating a surface portion with radiation, a photodetector device having at least one photosensitive element responsive to radiation reflected from the illuminated surface portion, and conversion means for integrating an output signal of the said at least one photosensitive element over time during an integration period of variable duration, which duration depends on power of the light source and level of radiation reflected from the illuminated surface portion, the optical sensing device further comprising means for sensing proximity of the illuminated surface portion with respect to the optical sensing device, said means including means for determining if the duration of said integration period reaches or is likely to reach a predetermined timeout value, power control means for increasing power of the light source if the duration of the integration period has reached or is likely to reach the predetermined timeout value, and means for detecting if the duration of the integration period has reached or is likely to reach the predetermined timeout value and if the power of the light source is at a maximum, such condition being indicative of the fact that a distance between the optical sensing device and the surface portion is greater than an operating distance.

Other aspects, features and advantages of the present invention will be apparent upon reading the following detailed description of non-limiting examples and embodiments made with reference to the accompanying drawings.

BRIEF DESCRIPTION OF THE DRAWINGS

FIG. 3 is a schematic illustration of an embodiment of an optical sensing device according to the invention;

FIG. 4 is a diagram exemplifying the evolution over time of integrated signals under different illumination conditions and showing possible reference values used as comparison for controlling the power of the light source;

DETAILED DESCRIPTION OF THE INVENTION

Figure 2:
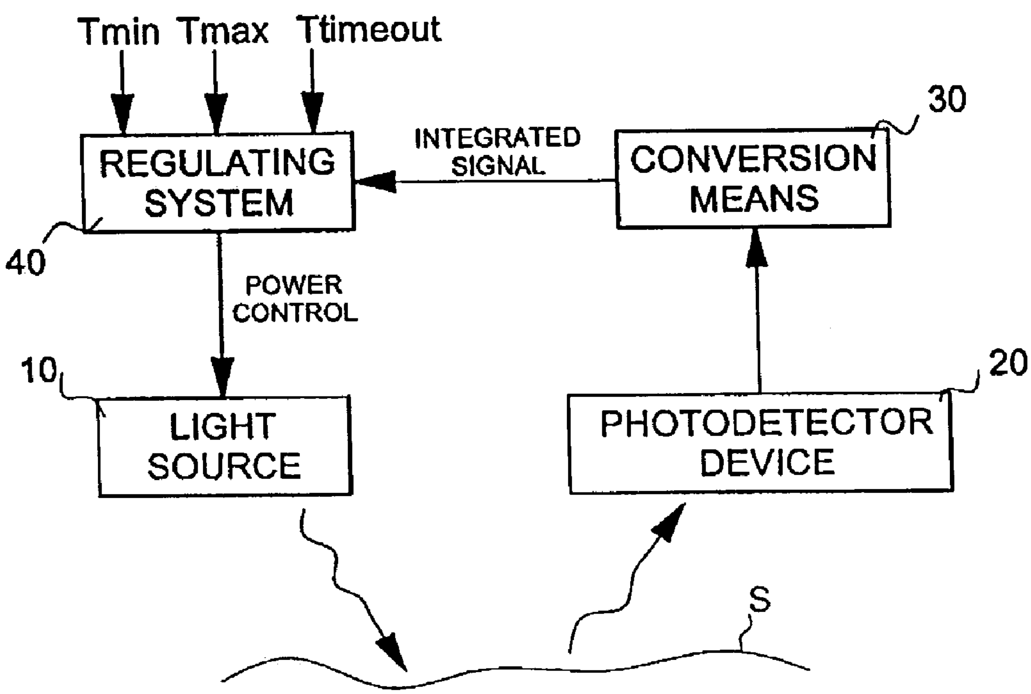
FIG. 2 is a diagram illustrating the basic principle of the invention.

FIG. 2 illustrates the basic principle of the invention. It basically consists of an optical sensing system comprising a light source 10 for illuminating a portion of a surface S with radiation, a photodetector device 20 having at least one photosensitive element responsive to radiation reflected from the illuminated surface portion S, conversion means 30, coupled to the output of the photodetector device 20, for integrating an output signal of the said at least one photosensitive element over time during an integration period of variable duration and a regulating system 40 for controlling the power of the light source as a function of the duration of the integration period. It should be stressed that the optical sensing system is designed, within the scope of the present invention, so that the integration period has a variable duration, designated Tint, which depends on the power of the light source 10 and the level of radiation reflected from the illuminated surface portion S. It will thus be appreciated that the optical sensing system of FIG. 2 includes some sort of feedback loop for enslaving the power of the light source 10 as a function of the evolution of the integration.

As this will be understood in the following, the regulating system 40 is used to control (i.e. adjust if necessary) the power of the light source so that the duration of the integration period remains, under normal conditions, in the vicinity of at least one reference duration value. As schematically illustrated in the example of FIG. 2, three reference values designated Tmin, Tmax and Ttimeout may be used.

FIG. 3 shows a more detailed block diagram of an optical sensing device according to one embodiment of the invention. This embodiment is based on timing of the duration of the integration period, i.e. the parameter representative of the evolution of the integration process is the duration of the integration period. It again includes a light source 10, a photodetector device 20, conversion means and a regulating system. Light source 10 may be a light emitting diode (LED) or any other suitable source for generating radiation within a desired wavelength range. For optical pointing device, this LED may advantageously be an infrared LED. The photodetector device 20 is of course to be chosen so as to be responsive to the radiation emitted by the light source 10 and should comprise at least one photosensitive element. In practice, the photodetector device 20 would comprise a plurality of such photosensitive elements, preferably arranged so as to form a two-dimensional array. Theoretically, the present principle is applicable to an optical system having only one photosensitive element. In FIG. 3, only one photosensitive element is thus shown for the purpose of explanation.

Figure 1:
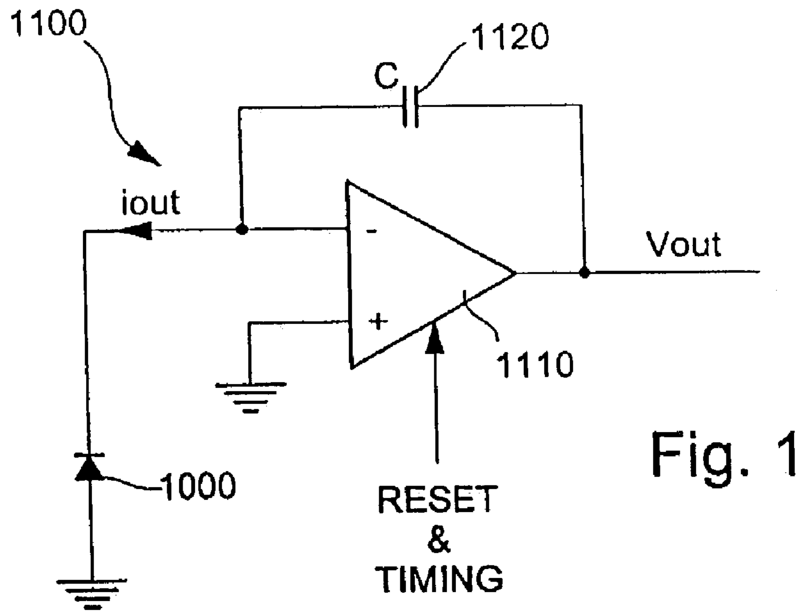
FIG. 1 is a schematic illustration of a conversion circuit coupled to a photosensitive element for integrating the output signal thereof over time.

As already mentioned hereinabove, the conversion means integrate the output signal of the photosensitive element over time during a so-called integration period of variable duration. In the embodiment of FIG. 3, the photosensitive element is coupled to an integrating circuit, designated by reference numeral 50, the operating principle of which is similar to that described in reference to FIG. 1. Timing and resetting of the integrating circuit 50 is adequately performed by means of a controller 52. The output of the integrating circuit 50 is coupled to a level detector 54 (or end-of-integration detector) the purpose of which is to detect when the output of the integrating circuit 50 (the integrated signal) reaches a determined threshold. When such condition is detected, level detector 54 outputs an interruption signal to controller 52, which in turn commands the integrating circuit 50 to interrupt the integration period. The resulting integrated signal at the output of circuit 50 is supplied to processing circuit (not shown in FIG. 3) for further processing and analysis. This principle basically corresponds to that described in the already mentioned pending U.S. patent application Ser. No. 10/001,963 filed on Dec. 5, 2001 in the name of the present Applicant.

In order to time the duration of the integration period, the optical sensing device of FIG. 3 is additionally provided with a timer 56 which is coupled to controller 52. This timer

56 is started, each time the output of photosensitive element 20 begins to be integrated by the associated conversion means. The output value of timer 56 will thus be representative of the duration of the integration period. Controller 52 resets this timer 56 before each activation period of the system.

The optical sensing device is further provided with a memory means 58 (whether of the volatile or non-volatile type) to store the reference value or values used for enslaving the power of the light source 10. The reference values are preferably programmable so as to allow an eventual adjustment of the operating parameters of the optical sensing device.

Controller 52 is coupled to light source 10 so as to control its operation as well as its power characteristics. To this end, a register 60 is provided for storing a value representative of the power of the light source to be selected during each flash. The value of this register 60 is adjusted by controller 52, if necessary, i.e. either increased, decreased or left unchanged, according to the duration value outputted by timer 56.

Turning now to FIG. 4, one will briefly illustrate how the power of the light source could be controlled as a function of the duration of the integration period according to a preferred embodiment. FIG. 4 is a diagram showing the evolution over time of integrated signals under four different illumination conditions. Curves a to d illustrate the evolution of four different integrated signals with increasing illumination levels. The three reference values Tmin, Tmax and Ttimeout briefly mentioned in reference to FIG. 2 are shown on the time axis. On the Y-axis is also shown a value designated Veoi used as threshold for interrupting integration. Curves a, b, c illustrate three cases where interruption of the integration period occurs respectively before Tmin (within range Tint<Tmin), after Tmin and before Tmax (within range Tmin≦Tint≦Tmax), and after Tmax (within range Tint>Tmax). On the other hand, curve d illustrates a case where interruption of the integration period occurs at time Ttimeout before the integrated signal reaches the threshold value Veoi.

In the preferred embodiment of FIG. 4, the duration range between Tmin and Tmax is chosen to be the target range or window within which one desires to maintain the duration of the integration period. Below Tmin, the duration of the integration period is regarded as being too short, which could degrade the sensor performance, and above Tmax, the duration of the integration period is regarded as being too long, which has a negative impact on sensor speed and power consumption. Within the window Tmin–Tmax, the duration of the integration period is regarded as adequate. Adjustment of the power of the light source is thus necessary only when the duration of the integration period falls outside of the reference window Tmin–Tmax. The use of a reference window with its lower and upper limits Tmin, Tmax is preferable so as not to change the power of the light source too frequently, which could also impair the sensor performance.

Below Tmin, one will understand that too much radiation is reflected from the illuminated surface and that the power of the light source should accordingly be decreased so as to compensate for this too high illumination. Of course, one assumes that the illumination level detected by the photodetector device is mostly dependent on the level of radiation emitted by the light source and reflected from the illuminated surface portion and that this illumination level is not mainly due to any other external source. It should however be mentioned, that if the decrease in power of the light source does not result in the expected increase of the duration of the integration period, this could be used as being indicative of a perturbation due to a parasitic source (such as ambient light or any other external source of radiation within the operating wavelength range) located in the vicinity of the photodetector device.

In contrast to the above situation, above Tmax, the level of light reflected from the illuminated surface portion is considered to be too low and the duration of the integration period therefore too long. Power of the light source should therefore be increased in order to reduce the duration of the integration period so that it again falls within the targeted window.

The use of the third reference value Ttimeout is useful in order to achieve the following objectives. Under some exceptional conditions, the level of light detected by the photodetector device can be so low that it would be unacceptable (mainly for reasons of sensor speed and power consumption) to let the conversion means integrate the output signal of the photodetector device until threshold Veoi. Such condition may occur for instance if no more light is reflected from the surface portion (the optical sensing device being for instance lifted from the illuminated reference surface). An extreme limit, or timeout value, is thus defined by Ttimeout above which no more integration should occur. In contrast to normal situations where the signals are integrated till they reach threshold Veoi, integration is interrupted before threshold Veoi is reached as soon as the duration of the integration period reaches the timeout limit Ttimeout.

Referring again to the embodiment of FIG. 3, as soon as the value of timer 56 reaches the timeout value Ttimeout, controller 52 interrupts operation of integrating circuit 50. In addition, the controller 52 further increases the power of light source 10 by adjusting register 60. If the timeout condition keeps occurring and the power of the light source 10 ultimately reaches its maximum after several successive flashes (which maximum is determined by the absolute limits of the light source and its driver), this can be held to be indicative of a "loss of reflection" condition (e.g. "the optical mouse has been lifted from the surface"). This condition can further be transmitted and outputted to the user or host system to which the optical sensing device is connected. One will therefore understand that there is thereby provided a means for sensing proximity of the sensing device with respect to the surface portion which is to be illuminated.

In addition, should the "loss of reflection" condition be detected (i.e. Tint>Ttimeout and light source power at its maximum), it is advantageous to further act on the activation rate of the optical sensing device. Indeed, as already mentioned, the optical sensing device (namely the light source, the photodetector device, the conversion means and the regulating system) is typically activated at a selected activation rate and during a selected activation period (which activation period is longer that the integration period). If the "loss of reflection" condition is detected, the activation rate can thus be decreased to a minimum for the purpose of saving power. This minimum should be selected with regard to the level of power consumption that can be saved and with regard to the time that would be taken by the system to detect that reflection from the illuminated surface has been re-established. Further, reporting of motion information from the optical pointing device may be suspended.

Figure 5:
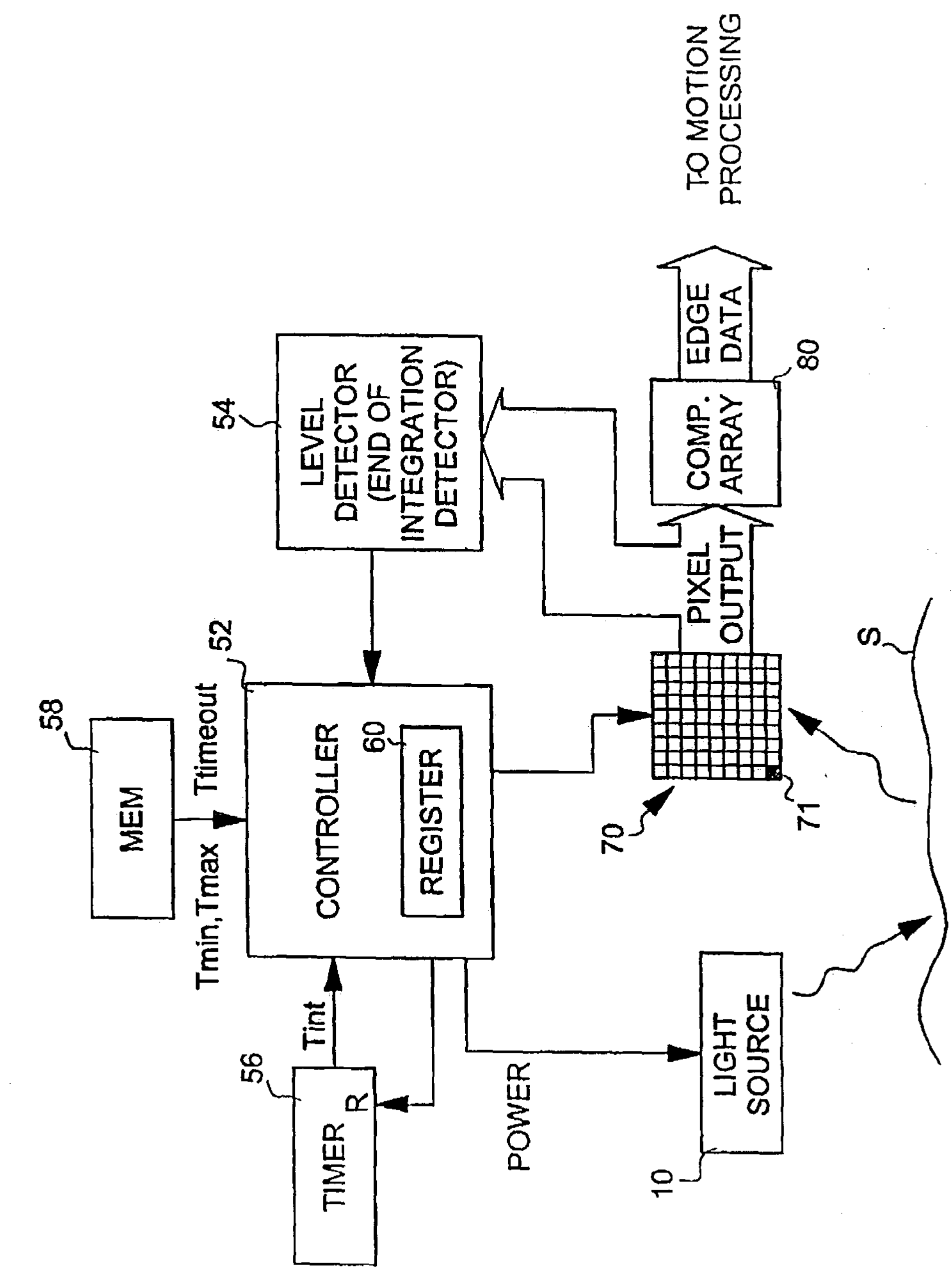
FIG. 5 is a schematic illustration of an embodiment of an optical pointing device implementing the invention.
Figure 6:
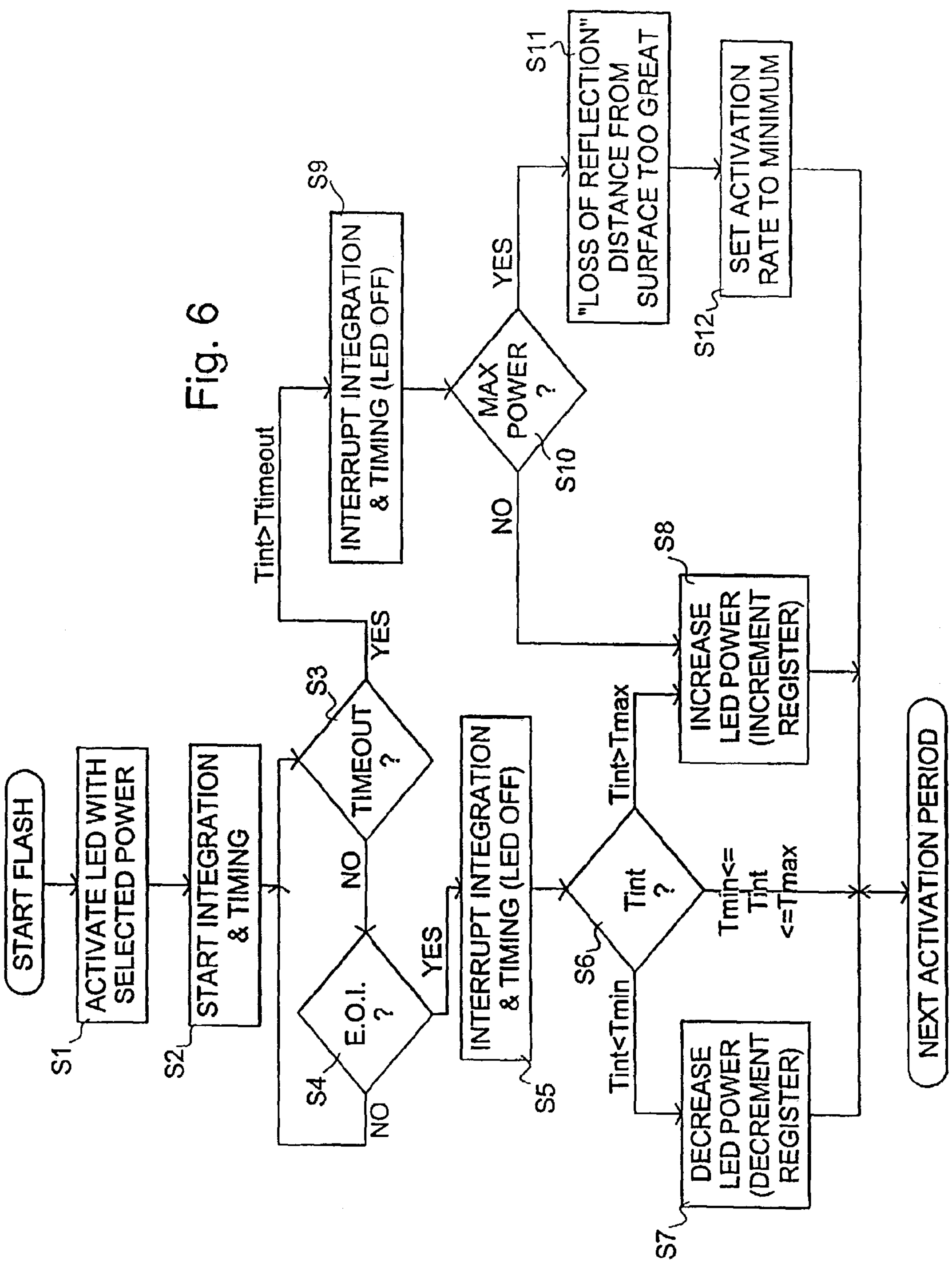
FIG. 6 is a flow chart illustrating a method for controlling operation of an optical sensing device according to an embodiment of the invention.

Turning to FIG. 6, one will briefly describe a preferred operation of an optical sensing device within the scope of the invention which mostly summarizes the different elements that have been described hereinabove. FIG. 6 shows a flowchart of operations which could be undertaken during each flash (or activation period) of the optical sensing device. This flowchart is applicable in particular to the optical sensing device of FIG. 2 as well as to the optical pointing device of FIG. 5 which will be described hereinafter.

Following the start of the flash, the first step S1 of FIG. 6 consists in activating the light source. This activation is made with consideration of the power settings that may be stored in an associated register as already mentioned. Next, at step S2, integration of the output signal of the photodetector device starts as well as the timing operation of the duration of the integration period.

At step S3, it is monitored whether the duration that is timed Tint reaches the timeout value Ttimeout. In the affirmative, the process continues at step S9. In the negative, the process continues at step S4 where it is checked whether the end of integration (E.O.I.) condition has been detected. As long as duration Tint has not reach the timeout value and end of integration has not been detected, steps S3 and S4 are continuously performed.

If the end of integration condition is detected at step S4, integration and timing operations are interrupted and the light source is deactivated at step S5. Duration Tint is compared at step S6 with the lower and upper reference values Tmin and Tmax of the target window. Power of the light source is either decreased at step S7 if Tint<Tmin, left unchanged if Tmin≦Tint≦Tmax, or increased at step S8 if Tint>Tmax. Steps S7 and S8 may advantageously consist of decrementing and respectively incrementing the power register, adjustment being performed in a stepwise manner.

If the timeout condition is detected following the comparison of Tint and reference value Ttimeout at step S3, integration and timing operation are interrupted and the light source is deactivated at step S9. Next, it is checked at step S10 whether power of the light source is already at its maximum. In the negative, the process proceeds to step S8 to increase the power of the light source. In the affirmative, as already mentioned, it is held at step S11 that a "loss of reflection" condition has occurred. Next at step S12, the activation rate of the system is adjusted to a minimum for the purpose of saving power.

The process of FIG. 6 is repeated in a similar manner during each activation period of the system. The flowchart of FIG. 6 is of course purely illustrative and shall not be considered as being a limitation of the scope of the invention. The steps may be modified in various aspects. Steps S11 and S12 are for instance optional and additional steps may be provided. For example, provided that the activation rate is adjusted at step S12, additional steps would be necessary to detect if reflection has been re-established. This could easily be performed by providing readjustment of the activation rate to its nominal value after the end of integration condition is detected at steps S4 and S5.

Figure 7:
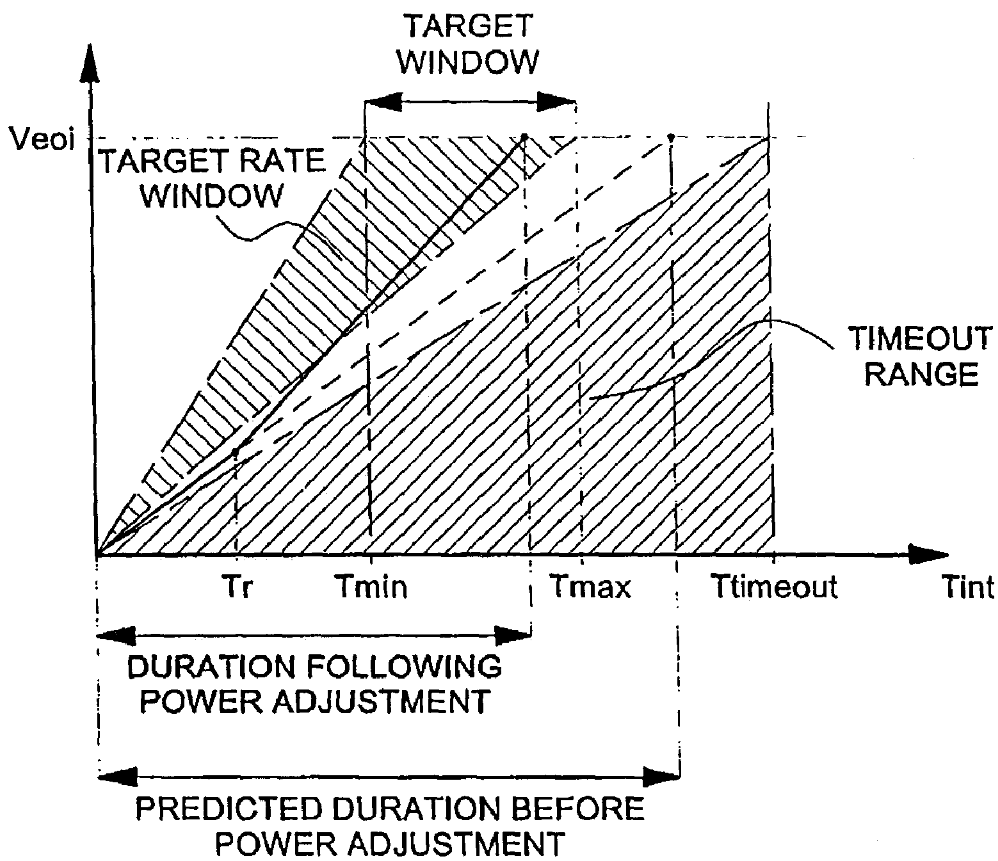
FIG. 7 is a diagram similar to that of FIG. 4 illustrating a variation for controlling the power of the light source which is based on monitoring of the rate of evolution of the integrated signals.

Instead of adjusting the power of the light source at the end of the activation period, power control may alternatively be performed "on the fly" while the light source is activated. This could be achieved provided the controller is adapted to monitor the rate of evolution of the integrated signals. If the integrated signals (averaged signal or maximum signal) increase too slowly or too quickly, this might be recognized fast enough to increase or respectively decrease the light source power while the light source is on. More specifically, as illustrated by the diagram of FIG. 7, this could be performed by determining the rate of evolution at a time, designated Tr before lower reference value Tmin. Since the evolution of the integrated signal may be assumed to be substantially linear (the illumination conditions being essentially constant during one activation period of the light source), one can predict, based on the slope of the curve of the integrated signal, the ultimate duration of the integration period and estimate whether it is going to remain or not within the targeted reference window. In contrast to the previous embodiment, this allows power adjustment of the light source while it is activated.

It will be appreciated that the same principle may be adopted in order to determine whether a timeout condition is likely to occur. In particular, one can compare the rate of evolution of the integrated output signal with a predetermined rate of evolution which corresponds to a rate below which it can be identified and predicted that the duration of the integration period is ultimately going to reach the predetermined timeout value Ttimeout. This zone is identified as the "TIMEOUT RANGE" in FIG. 7. One may either decide to interrupt integration if such condition occurs or adjust, namely increase, the light source power if this is still possible. Again, in case the power of the light source is set to a maximum, one may exploit this method to implement a proximity sensor.

Turning now to FIG. 5, one will describe an embodiment of an optical pointing device which implements the regulation scheme based on timing of the duration of the integration period. The components that are essentially similar to those of the embodiment of FIG. 2 are designated by the same references, namely the light source 10, the controller 52, the end of integration detector 54, the timer 56, the memory means 58 and the register 60. In contrast to the embodiment of FIG. 2, the embodiment of FIG. 5 is specifically adapted for a use in an optical pointing device such as an optical mouse or trackball. This embodiment thus comprises an optical sensing unit 70 comprising a photodetector array including a plurality of pixels 71 responsive to radiation reflected from the surface portion S. Each pixel includes the arrangement of a photosensitive element coupled to a corresponding integrating circuit. Each pixel configuration may essentially be similar to that shown in FIG. 1. The pixel outputs are fed to the end of integration detector 54 as well as to a comparator array 80. Comparator array essentially consists of a plurality of comparator circuits which are used to extract edge information data from the pixel outputs, i.e. data that is subsequently exploited by the motion processing circuitry (not shown) according to the so-called "Edge Motion Detection" technique briefly mentioned in the preamble of the specification. This specific circuit configuration is part of the subject matter of pending international application No. PCT/EP 02/13686 (Published International Application No. WO 03/049018) filed on Dec. 3, 2002 which has been mentioned hereabove and will not be described here again.

In contrast to the embodiment of FIG. 2, the end of integration detector 54 is designed to monitor the outputs of all pixels. As soon as end of integration is detected, the controller 52 interrupts integration of all integrating circuits within photodetector array 70 simultaneously. End of integration may be detected in essentially two ways. A first solution consists in only monitoring the integrated signal provided by the brightest pixel in array 70, i.e. the pixel which is the most illuminated, and detect when this integrated signal reaches the threshold Veoi. Another solution consists in averaging all pixel outputs and detecting when the resulting averaged signal reaches the threshold Veoi.

The embodiment of FIG. 5 essentially behaves in a similar manner to that of FIG. 2. Namely, upon detection of the end of integration condition by detector 54, controller 52 interrupts operation of the integrating circuits and then compares the timed duration Tint of the integration period provided by timer 56 with reference values Tmin and Tmax stored in memory 58. According to the result of this comparison, the power of the light source 10 is either decreased if duration Tint is lower than Tmin, increased if duration Tint is greater than Tmax, or left unchanged if duration Tint is within the targeted window Tmin–Tmax. Power is again adjusted through a stepwise adjustment of register 60. For the next flash, light source 10 is operated according to the value of register 60.

In addition, while the integrating circuits are operating, controller 52 also monitors the timed duration supplier by timer 56 and compares it with the third reference value, or timeout value, Ttimeout. If timeout occurs, then controller 52 commands the integrating circuits to interrupt integration (controller 52 also deactivates the light source) and increments register 60 for the next flash. If the power settings of the light source 10 are already at maximum, controller 52 advantageously generates a "loss of reflection" warning signal and, eventually, decreases the activation rate of the system.

Having described the invention with regard to certain specific embodiments, it is to be understood that these embodiments are not meant as limitations of the invention. Indeed, various modifications and/or adaptations may become apparent to those skilled in the art without departing from the scope of the annexed claims. For instance, the proposed embodiments are not necessarily limited to devices comprising a light emitting diode as light source or photodiodes as photosensitive elements. Any other suitable light source and photosensitive element may be used.

In addition, as already mentioned, adjustment of the power of the light source may either be performed at the end of each activation period (or "flash") or "on the fly" while the light source is activated and the conversion means are still running.

What is claimed is:

1. An optical sensing device comprising:

a light source for illuminating a surface portion with radiation;

a photodetector device having at least one photosensitive element responsive to radiation reflected from the illuminated surface portion; and conversion means for integrating an output signal of said at least one photosensitive element over time during an integration period of variable duration, which duration depends on power of said light source and level of radiation reflected from the illuminated surface portion, said optical sensing device further comprising a regulating system for controlling the power of the light source as a function of a comparison between a parameter representative of the evolution of the integration of the output signal of said at least one photosensitive element and at least one reference value;

wherein said representative parameter is a rate of evolution of the integrated output signal of said at least one photosensitive element, said regulating system comprising:

means for determining said rate of evolution during the integration period;

comparator means for comparing the determined rate of evolution with at least one reference rate value; and power control means for controlling the power of the light source as a function of the result of the comparison between the determined rate of evolution and said at least one reference rate value.

2. The optical sensing device of claim 1, further comprising a programmable memory means for storing said at least one reference value.

3. The optical sensing device of claim 1, wherein said regulating system comprises means for interrupting integration of the output signal of said at least one photosensitive element if the duration of the integration period reaches or is likely to reach a predetermined timeout value, said regulating system increasing power of said light source if the duration of said integration period has reached or is likely to reach the predetermined timeout value.

4. An optical sensing device comprising:

a light source for illuminating a surface portion with radiation;

a photodetector device having at least one photosensitive element responsive to radiation reflected from the illuminated surface portion; and conversion means for integrating an output signal of said at least one photosensitive element over time during an integration period of variable duration, which duration depends on power of said light source and level of radiation reflected from the illuminated surface portion, said optical sensing device further comprising a regulating system for controlling the power of the light source as a function of a comparison between a parameter representative of the evolution of the integration of the output signal of said at least one photosensitive element and at least one reference value;

wherein said regulating system controls the power of the light source so that the duration of said integration period remains within a reference window having lower and upper reference values, said regulating system decreasing power of the light source so as to maintain the duration of said integration period above the window's lower reference value and increasing power of the light source so as to maintain the duration of said integration period below the window's upper reference value.

5. A method for controlling operation of an optical sensing device having a light source and a photodetector device with at least one photosensitive element, said method comprising the steps of:

illuminating a surface portion with radiation by means of said light source;

detecting radiation reflected from the illuminated surface portion with said at least one photosensitive element; and while said surface portion is being illuminated, integrating an output signal of said at least one photosensitive element over time during an integration period of variable duration, which duration depends on power of the light source and level of radiation reflected from said illuminated surface portion, said method further comprising the steps of: determining a parameter representative of the evolution of the integration of the output signal of said at least one photosensitive element;

comparing the determined representative parameter with at least one reference value; and controlling power of the light source as a function of the result of the comparison between the determined representative parameter and said at least one reference value;

wherein said representative parameter is the duration of said integration period or a rate of evolution of the integrated output signal of said at least one photosensitive element.

6. The method of claim 5, comprising the step of providing a register the value of which determines the power of said light source, said step of controlling power of the light source including adjusting the value of said register.

7. The method of claim 5, wherein the power of said light source is controlled in a stepwise manner.

8. The method of claim 5, further comprising the steps of:

interrupting integration of the output signal of said at least one photosensitive element if the duration of said integration period reaches or is likely to reach a predetermined timeout value; and increasing the power of said light source if the duration of said integration period has reached or is likely to reach the predetermined timeout value.

9. The method of claim 8, further comprising the step of providing a warning signal if the duration of said integration period has reached or is likely to reach the predetermined timeout value and if the power of said light source is at a maximum.

10. The method of claim 8, comprising the step of periodically activating the optical sensing device at a selected activation rate, said method further comprising the step of setting said activation rate to a minimum if duration of said integration period has reached or is likely to reach the predetermined timeout value and if the power of said light source is at a maximum.

11. The method of claim 5, wherein said representative parameter is a rate of evolution of the integrated output signal of said at least one photosensitive element, power of the light source being controlled while said light source is activated.

12. A method for controlling operation of an optical sensing device having a light source and a photodetector device with at least one photosensitive element, said method comprising the steps of:

illuminating a surface portion with radiation by means of said light source;

detecting radiation reflected from the illuminated surface portion with said at least one photosensitive element; and while said surface portion is being illuminated, integrating an output signal of said at least one photosensitive element over time during an integration period of variable duration, which duration depends on power of the light source and level of radiation reflected from said illuminated surface portion, said method further comprising the steps of: determining a parameter representative of the evolution of the integration of the output signal of said at least one photosensitive element;

comparing the determined representative parameter with at least one reference value; and controlling power of the light source as a function of the result of the comparison between the determined representative parameter and said at least one reference value;

wherein the power of the light source is controlled so that the duration of said integration period remains within a reference window having lower and upper reference values, the power of said light source being decreased or increased so as to maintain the duration of the integration period respectively above the window's lower reference value and below the window's upper reference value.

13. An optical pointing device comprising:

a light source for repetitively illuminating a surface portion with radiation; and an optical sensing unit comprising a photodetector array including a plurality of pixels responsive to radiation reflected from the illuminated surface portion, each of said pixels including a photosensitive element coupled to an integrating circuit for integrating an output signal of the photosensitive element during an integration period of variable duration, which duration depends on power of said light source and level of radiation reflected from the illuminated surface portion, wherein said optical pointing device further comprises a regulating system including:

means for determining a parameter representative of the evolution of the integration of the output signals of the photosensitive elements;

comparator means for comparing the determined representative parameter with at least one reference value; and power control means for controlling the power of the light source as a function of the result of the comparison between the determined representative parameter and said at least one reference value, wherein said representative parameter is the duration of said integration period or a rate of evolution of the integrated output signals of said photosensitive elements.

14. The optical pointing device of claim 13, wherein said integrating circuits integrate the output signals of said photosensitive elements until the integrated output signal of a most illuminated one of said pixels reaches a predetermined value or until an averaged signal derived from the integrated output signals of said pixels reaches a predetermined value.

15. The optical pointing device of claim 13, further comprising a programmable memory means for storing said at least one reference value.

16. The optical pointing device of claim 13, further comprising a register the value of which determines the power of said light source, said register being adjusted in a stepwise manner as a function of the result of the comparison between the determined representative parameter and said at least one reference value.

17. The optical pointing device of claim 13, further comprising means for interrupting integration of said output signals if the duration of said integration period reaches or is likely to reach a predetermined timeout value, said power control means increasing power of said light source if the duration of said integration period has reached or is likely to reach the predetermined timeout value.

18. The optical pointing device of claim 17, further comprising means for generating a warning signal if the duration of said integration period has reached or is likely to reach the predetermined timeout value and if the power of said light source is at a maximum.

19. The optical pointing device of claim 17, further comprising means for periodically activating said light source, said optical sensing unit and said regulating system at a selected activation rate, and means for setting said activation rate to a minimum if the duration of said integration period has reached or is likely to reach the predetermined timeout value and if the power of said light source is at a maximum.

20. An optical pointing device comprising:

a light source for repetitively illuminating a surface portion with radiation; and an optical sensing unit comprising a photodetector array including a plurality of pixels responsive to radiation reflected from the illuminated surface portion, each of said pixels including a photosensitive element coupled to an integrating circuit for integrating an output signal of the photosensitive element during an integration period of variable duration, which duration depends on power of said light source and level of radiation reflected from the illuminated surface portion, wherein said optical pointing device further comprises a regulating system including:

means for determining a parameter representative of the evolution of the integration of the output signals of the photosensitive elements;

comparator means for comparing the determined representative parameter with at least one reference value; and power control means for controlling the power of the light source as a function of the result of the comparison between the determined representative parameter and said at least one reference value;

wherein said power control means control the power of the light source so that the duration of said integration period remains within a reference window having lower and upper reference values, said power control means decreasing power of the light source so as to maintain the duration of said integration period above the window's lower reference value and increasing power of the light source so as to maintain the duration of said integration period below the window's upper reference value.

21. An optical sensing device for use in a pointing device comprising:

a light source for illuminating a surface portion with radiation;

a photodetector device having at least one photosensitive element responsive to radiation reflected from the illuminated surface portion; and conversion means for integrating an output signal of said at least one photosensitive element over time during an integration period of variable duration, which duration depends on power of said light source and level of radiation reflected from the illuminated surface portion, said optical sensing device further comprising means for sensing proximity of the illuminated surface portion with respect to the optical sensing device, said means including:

means for determining if the duration of said integration period reaches or is likely to reach a predetermined timeout value;

power control means for increasing power of said light source if the duration of said integration period has reached or is likely to reach the predetermined timeout value; and means for detecting if the duration of said integration period has reached or is likely to reach the predetermined timeout value and if the power of said light source is at a maximum, such condition being indicative of the fact that a distance between the optical sensing device and the surface portion is greater than an operating distance.

22. The optical sensing device of claim 21, further comprising:

timer means for timing the duration of the integration period; and comparator means for comparing the timed duration of the integration period with said predetermined timeout value.

23. The optical sensing device of claim 21, further comprising:

means for determining a rate of evolution of the integrated output signal of said at least one photosensitive element during integration; and comparator means for comparing the determined rate of evolution with a predetermined rate of evolution which corresponds to a rate of evolution below which it can be predicted that the duration of the integration period is going to reach said predetermined timeout value.

24. The optical sensing device of claim 21, wherein said photodetector device comprises a plurality of photosensitive elements and wherein said means for determining if the duration of said integration period reaches or is likely to reach a predetermined timeout value monitor the evolution of the integrated output signal of a most illuminated one of said photosensitive elements or of an averaged signal which is derived from the integrated output signals of said photosensitive elements.

* * * * *